May 13, 1941.  J. A. CERNY  2,241,981
THERMOSTATIC CONTROL MECHANISM
Filed Dec. 9, 1937
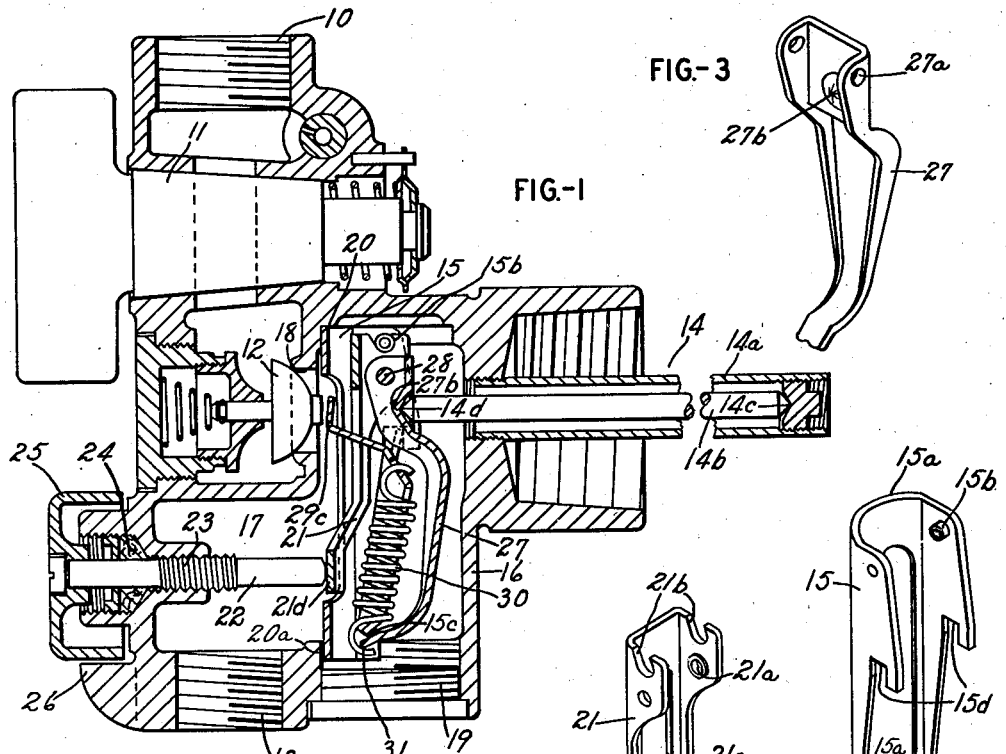
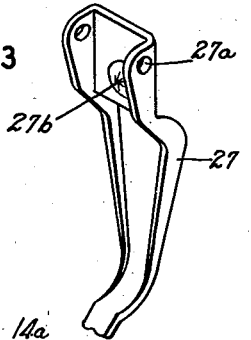
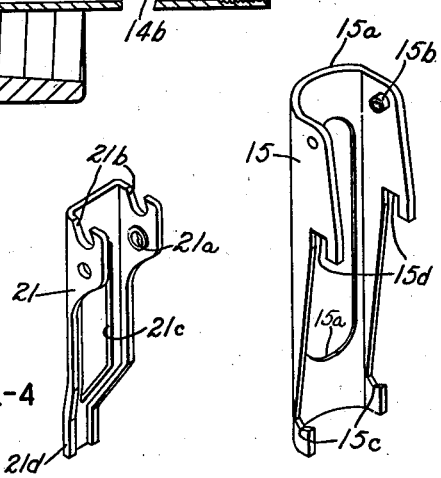
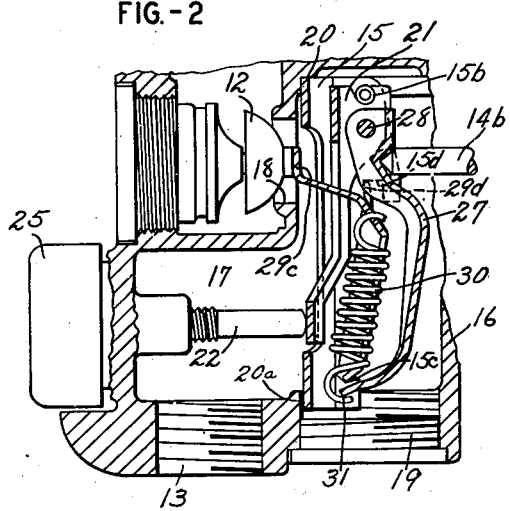
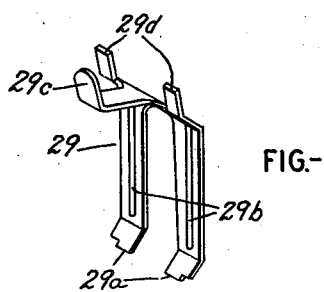
INVENTOR
JOSEPH A. CERNY
ATTORNEYS Patented May 13, 1941

UNITED STATES PATENT OFFICE 2,241,981

THERMOSTATIC CONTROL MECHANISM

Joseph A. Cerny, Cleveland, Ohio, assignor to The Titan Valve and Manufacturing Company, Cleveland, Ohio, a corporation of Ohio Application December 9, 1937, Serial No. 178,927

6 Claims. (Cl. 236—48)

This invention relates to improvements in thermostatic control mechanism.

An object of the present invention is to provide in thermostatic control mechanism a simple arrangement of a multiple-lever snap-acting device adapted for easy manufacture and for quick and accurate assembly in the completed mechanism.

Another object of the present invention is to provide a novel arrangement of a multiple-lever snap-acting thermostatically controlled device with an easy and accurate adjustment for temperature range.

Another object of the invention is the provision of a device of the type described mounted on a frame which in an assembly operation only requires to be placed in a predetermined position in a casing where it is thereafter held by the inherent structure of the parts without requiring any other connection with the casing.

Other objects and advantages of the invention include the special arrangement of fulcrums for the levers involved, a special arrangement of temperature range adjusting means, and other details of structure and arrangement as will more fully appear in the accompanying specification and drawing.

In the drawing, Fig. 1 is a sectional view through a thermostatic device involving my invention and showing the parts with a control member in unoperated position; Fig. 2 is a sectional view of a portion of the mechanism of Fig. 1, showing the control member in operated position; while Figs. 3, 4, 5 and 6 are perspective views of various parts of the mechanism.

My improved thermostatic device is capable of general use but is shown herein in a form adapted for use with water heaters and the like. In such apparatus a fuel such as gas, enters the thermostatic equipment at 10, its flow being controlled by a main cock 11 and by a thermostatically controlled valve 12. The gas passes out of the device at 13 and thence to a burner which operates in response to a thermostat generally indicated at 14 which is installed in the water compartment. This thermostat is of the type comprising an outer tube 14a having a relatively large coefficient of expansion and an inner rod 14b having a relatively small coefficient of expansion. The rod has a point contact at 14c with the closure member of the tube and preferably a point contact at 14d with one of the levers of the multiple lever snap acting mechanism. The arrangement of the parts is such that upon cooling of the water in the water compartment, tube 14a contracts, moving rod 14b to the left, which through the multiple lever mechanism opens valve 12 as shown in Fig. 2, thus supplying fuel to the burner. Upon rise in temperature of the water in the compartment, tube 14a expands, allowing rod 14b to move toward the right, resulting in closure of valve 12 as shown in Fig. 1.

According to the present invention, the multiple lever snap acting mechanism is in the form of a self-contained unit including a supporting frame 15 shown in detail in Fig. 5 and upon which all parts of the snap acting mechanism are mounted and supported. The parts of this unit may be assembled on the bench and the assembled unit may then be pushed into its place in the casing 16, and more particularly into the gas chamber 17 thereof through which gas flows from the valve port 18 controlled by valve 12 to the outlet 13. The casing is tapped and provided with a removable plug at 19 to provide for introduction or removal of the frame 15 and its attached parts. A predetermined bearing surface is provided within the casing 16 for the frame 15 of said unit, and the arrangement of the parts is such that in the final assembly the frame 15 is held in position against its predetermined bearing surface by the tension of a helical tension spring forming part of a snap-acting mechanism, later to be referred to, without any physical attachment of the unit or its parts to the casing 16. In the form illustrated, a drilling or boring tool entering at the point 19 cuts away curved surfaces or shoulders at the points 20, 20a, and the correspondingly curved surface 15a of member 15 bears and is held against these portions of the casing when all parts are fully assembled.

Pivotally mounted on pivots 15b of the frame 15 is an adjustable support arm 21 best seen in Fig. 4. This may be mounted in the conventional manner on pivots 15b but in the form shown I have provided open or recessed pivot bearings 21b and these are held in engagement with the pivots 15b by the effect of a tension spring forming part of a snap-acting mechanism, as will later appear. The arm 21 is cut away as at 21c to lighten the parts and to allow for the spring action later described. The arm also has a narrowed and offset end portion 21d adapted to be engaged by an adjusting rod member 22. This adjusting member has a threaded connection at 23 with a boss on the casing and is provided with packing at 24 to prevent gas leakage. The outer end of member 22 is provided with an adjusting knob 25 which preferably carries temperature graduations adapted to be adjusted with respect to the pointer 26 so as to indicate the setting of the device.

Pivotally mounted on the arm 21 is the main or thermostat lever 27 best seen in Fig. 3. A pin 28 passes through the openings 27a of the lever and the openings 21a of the support arm to provide this pivotal mounting. It will be noted that this pin 28 is fairly close to the pivots 15b and substantially directly beneath them. This lever is provided with a slight depression at 27b to fix the point of engagement of the end 14d of the thermostat rod. At the lower end of frame 15 are provided a pair of fulcrum seats 15c adapted to receive the lower ends 29a of the arms of a bifurcated lever 29, best seen in Fig. 6. The arms of this lever are provided with stiffening deformation 29b. The upper end of the lever is bent outwardly to provide the tongue 29c adapted to engage the end of valve 12. A helical tension spring 30 is connected at its upper end in an opening in lever 29 and at its lower end at the point 31 is connected with the free end of lever 27. To limit the movement of lever 29 as it swings backward and forward, there are provided a pair of ears 29d on the lever 29 adapted to engage with the sides of notches 15d in the frame 15.

It is thought the operation of the device will be clear from the description. For instance with the parts in the position of Fig. 1, when tube 14a is cooled, rod 14b moves toward the left, swinging lever 27 in a clockwise direction about its pivot 28, thus carrying the point 31 on spring 30 far enough to the left of the fulcrum point 15c so that spring 30 exerts a force tending to move lever 29 in a counterclockwise direction from the position of Fig. 1 to that of Fig. 2 with a snap action, thus opening valve 12. Upon a heating of tube 14a, lever 27 moves in a counterclockwise direction, returning the point 31 to the position of Fig. 1, whereupon the spring 30, again with snap action, causes lever 29 to move in a clockwise direction permitting valve 12 to close under the influence of its spring.

It will be obvious to one skilled in this art that points 15c and 31 might be interchanged. That is to say, the lower end of spring 30 might be supported on frame 15 and the lower end of lever 29 might be fulcrumed at the free end of lever 27. The only difference made by such an arrangement would be that movement of lever 27 in a clockwise direction would cause movement of lever 29 also in a clockwise direction. This would be a suitable arrangement for certain thermostatic controls where it was desired to have the valve 12 open upon a heating of tube 14a.

Obviously if such a modification were desired to operate in a water heater such as has previously been described, the relative expansibility of the members 14a and 14b would have to be reversed or the direction of opening and closing of valve 12 might be reversed, or point 27b might be located on the opposite side of pivot 28.

It will be noted that the adjusting rod 22 acts on a long lever arm of member 21 about the pivots 15b and that the lever arm from 15b to 27b is relatively short so that any adjustment at the point 21d results in a much finer adjustment at the point 27b so as to regulate the temperature range of the device. That is to say, adjustment of rod 22 and of the lever 21 varies the mean temperature which the control mechanism is intended to maintain. Also the threads at the point 23 may be fine so as to give a very close adjustment. This feature in its broader aspects is disclosed and claimed in my copending application for Thermostatic valve mechanism, Serial No. 174,306, filed November 13, 1937.

Several effects of spring 30 will be apparent besides the snap action effect on lever 29. For instance the line of force of spring 30 is always to the right of pivots 28 and 15b. Therefore the spring tends to urge lever 27 in a counterclockwise direction, holding it in engagement with the end 14d of the thermostat rod. Also, with the rod and lever 27 in engagement, the action of spring 30 is to cause a moment tending to turn support arm 21 in a clockwise direction, holding the point 21d in engagement with the adjusting member 22. This same force of spring 30 acting on lever 27 about the point 27b exerts a pressure upward and rearward of the seats 21b against the pivots 15b so as to hold the support arm 21 in the position shown in Figs. 1 and 2. At the same time this same force exerts a thrust toward the left as viewed in Figs. 1 and 2 on the pivots 28 and 15b, thus urging the surfaces 15a against the arcuate shoulders 20, 20a within the casing 16. It will be noted also that spring 30 acts through lever 29 against seats 15c always in a direction to push the lower part of frame 15 toward the left as seen in Figs. 1 and 2 and against the front wall of casing 16. This serves to hold the frame 15 firmly in position without other fastenings. It will be obvious that the parts shown in Figs. 3 to 6 may be accurately manufactured in quantity production, all of the pivots and fulcrums being easily located in exact position in the normal course of manufacture. It will also be obvious that the valve port 18 and the shoulder 20 in casing 16 may be accurately positioned when these parts are machined. It is thus easy to assemble my device so that each instrument is exactly like every other one. It is only necessary to assemble the parts on the frame 15 and place it in the position shown in Figs. 1 and 2, whereupon all of the points necessary for the accurate operation of the device are definitely located in predetermined relationship.

What I claim is:

1. In control mechanism of the class described, a control member, a thermostat, a casing, a frame removably mounted within said casing, a lever fulcrumed upon said frame at one point, a support arm fulcrumed upon said frame at another point spaced from said first point, a thermostat lever fulcrumed on said arm, said levers extending in opposite directions from their respective fulcrums and being operatively associated with said member and said thermostat respectively, a tension spring connected between the free ends of said levers, and the arrangement of the parts being such that said spring is carried by movement of said thermostat lever to opposite sides of the fulcrum of said control member lever.

2. Control mechanism as in claim 1, including means for adjusting said support arm to various positions to vary the mean temperature which the control mechanism is intended to maintain.

3. In control mechanism of the class described, a control member, a thermostat, a casing, a frame removably mounted within said casing, a support arm fulcrumed near one end of said frame, a thermostat lever fulcrumed on said arm and extending toward the other end of said frame, a second lever having a fulcrum point, a spring having a connection point, one of said points being on said frame near its other end and the other of said points being on said first named lever near its free end, said spring being also connected with the free end of said second lever, said levers being operatively associated with said member and said thermostat respectively, and the arrangement of the parts being such that movement of said thermostat lever carries the said point thereon to opposite sides of the other of said points.

4. Control mechanism as in claim 3, wherein the first named connection point of said spring is on said thermostat lever, and the fulcrum of said support arm is an open pivot arranged to be held in pivot engagement by the force of said spring acting on said thermostat lever.

5. Control mechanism of the class described, comprising the combination with a casing, of a control member, a thermostat, a removable frame within said casing, a support fulcrumed upon said frame, two levers lying generally parallel with each other and each fulcrumed near the free end of the other, one upon the frame and the other upon the support at a point spaced from the fulcrum thereof in the direction of the length of said levers, the thermostat being associated with one lever to operate the same and the control member with the other lever to be operated thereby, spring means operatively connecting the two levers for producing snap action of said control member, means for turning the support about its fulcrum to thereby adjust the fulcrum of the lever associated with said thermostat transversely to its length and thus vary the mean temperature which the control mechanism is intended to maintain.

6. Control mechanism of the class described, comprising the combination with a casing, of a control member, a thermostat, a removable frame within said casing, a support fulcrumed upon said frame, two levers lying generally parallel with each other and each fulcrumed near the free end of the other, one upon the frame and the other upon the support at a point spaced from the fulcrum thereof in the direction of the length of said levers, the thermostat being arranged to operatively engage the lever which is fulcrumed to the support on the other side of its own fulcrum from the support fulcrum and the control member being associated with the other lever to be operated thereby, spring means operatively connecting the two levers for producing snap action of said control member, and means for turning the support about its fulcrum to thereby adjust the fulcrum of the lever associated with said thermostat transversely to its length to thus vary the mean temperature which the control mechanism is intended to maintain.

JOSEPH A. CERNY.